United States Patent [19]

DeGeorge et al.

[11] Patent Number: 5,083,458

[45] Date of Patent: Jan. 28, 1992

[54] METHOD AND APPARATUS FOR RECORDING LOADED RUNNING TOOTH CONTACT PATTERNS ON LARGE REDUCTION GEARS

[75] Inventors: Vincent A. DeGeorge, Malden; Michael A. Burt, Saugus; Reginald B. Santos, Salisbury, all of Mass.; Bruce G. Keiper, Bothell, Wash.

[73] Assignee: General Electric Company, Schenectady, N.Y.

[21] Appl. No.: 662,977

[22] Filed: Feb. 28, 1991

Related U.S. Application Data

[63] Continuation of Ser. No. 408,035, Sep. 15, 1989, abandoned.

[51] Int. Cl.$^5$ .................... G01M 13/02; G01P 3/40
[52] U.S. Cl. ........................... 73/162; 33/501.7; 33/501.17; 33/501.18; 33/DIG. 14; 356/392; 356/394
[58] Field of Search .............. 73/162; 33/358, 501.7, 33/501.8, 501.9, 501.17, 501.18, 501.4, 501.5, DIG. 14; 356/356, 392, 394, 36; 358/100, 106; 354/293

[56] References Cited

U.S. PATENT DOCUMENTS

| | | | |
|---|---|---|---|
| 1,732,730 | 10/1929 | Porter et al. | 33/501.17 X |
| 1,812,369 | 6/1931 | Porter et al. | 33/501.17 |
| 2,561,534 | 7/1951 | Parker et al. | 33/501.18 X |
| 2,657,469 | 11/1953 | Brown | 33/501.17 X |
| 2,673,401 | 3/1954 | Bradner | 33/501.17 |
| 2,768,449 | 10/1956 | Fry | 33/501.17 X |
| 2,796,672 | 6/1957 | Oesterheld | 356/394 X |
| 2,901,831 | 9/1959 | Halvarsson | 33/501.18 |
| 2,949,057 | 8/1960 | Polidor | 356/392 |
| 3,740,467 | 6/1973 | Kubo et al. | 356/394 X |
| 3,877,150 | 4/1975 | Höfler | 33/501.14 |
| 3,924,953 | 12/1975 | Allard | 356/394 X |
| 3,979,834 | 9/1976 | Brookfield | 33/501.18 X |
| 4,105,340 | 8/1978 | Kempf | 356/392 X |
| 4,137,642 | 2/1979 | Halvarsson | 33/501.7 |
| 4,341,452 | 7/1982 | Korling | 354/293 X |
| 4,390,278 | 6/1983 | Inoue | 356/392 |
| 4,544,268 | 10/1985 | Yamada et al. | 356/394 |
| 4,618,256 | 10/1986 | Bartolomeo | 73/162 X |
| 4,699,484 | 10/1987 | Howell et al. | 354/293 |
| 4,721,388 | 1/1988 | Takagi et al. | 356/394 X |
| 4,765,065 | 8/1988 | Bennett | 33/501.17 X |
| 4,789,947 | 12/1988 | Maciejczak | 358/100 X |
| 4,906,098 | 3/1990 | Thomas et al. | 356/394 X |

FOREIGN PATENT DOCUMENTS

| | | | |
|---|---|---|---|
| 46-19507 | 1/1971 | Japan | 356/356 |
| 55-1568 | 1/1980 | Japan | 73/162 |
| 102106 | 6/1984 | Japan | 356/394 |

Primary Examiner—William A. Cuchlinski, Jr.
Assistant Examiner—Scott W. Cummings
Attorney, Agent, or Firm—Nixon & Vanderhye

[57] ABSTRACT

Method for recording loaded running tooth contact patterns on navy or marine large reduction gears comprising the steps of providing a pair of meshing gears having transversely spaced teeth with surfaces subject to wear, coating the surfaces of as least one gear with a substance providing visual indication of tooth wear, running the gears under load, providing a platform adapted to move along the teeth and adapted to support and guide a video imaging probe, moving the platform along selected teeth while directing the probe at the contact surface of a transversely spaced "observed" tooth, and recording a video image of the observed tooth surface. The method further includes synchronizing the video image with the video image of an identification marker temporarily disposed adjacent to the observed tooth and synchronizing the video image with an audio record describing the tooth contact location and pattern.

18 Claims, 5 Drawing Sheets

METHOD AND APPARATUS FOR RECORDING LOADED RUNNING TOOTH CONTACT PATTERNS ON LARGE REDUCTION GEARS

This is a continuation of application Ser. No. 07/408,035, filed Sept. 15, 1989, now abandoned.

BACKGROUND OF THE INVENTION

This invention relates generally to a method for inspecting and permanently recording contact patterns on large reduction gears and more particularly to a method for systematically recording loaded running tooth contact patterns on large gears, such as navy and marine main propulsion reduction gears.

In high torque precision gearing, such as used in reduction gear sets for navy and marine propulsion, proper alignment of the gears with uniform contact along the flanks of the meshing gear teeth is paramount in insuring long life of the gears, as well as quiet and smooth operation. High torque precision gears are more generally furnished with double helical teeth to reduce noise and vibration. The customary procedure for establishing uniform tooth contact across the gear face has been to adjust the bearings that support the gears in the gear casing. Assuming that the gear teeth are perfectly matched, as to helix lead angle and gear modification, uniform tooth contact can then be achieved if the axes of the two gears are both parallel and co-planar.

In the case of navy and marine reduction gears in particular, there are usually two reductions from the input to the output shaft by way of a pair of intermediate shafts. Each of the meshing gear sets are of the "herringbone" or double helical type. Although the gears may be perfectly aligned in the factory and carried in a large casing housing, inevitably misalignment can occur under load in a propulsion gear unit. It is necessary to load (operate) and then inspect the loaded running tooth contact patterns and to make adjustments in the bearings in order to re-establish uniform tooth contact across the gear face.

The customary procedure in the prior art is to coat one set of meshing teeth with a substance to provide a visual indication of tooth wear, and then to run the gears under load. Subsequently the visual inspection is made and the contact patterns are recorded by making a sketch of the contact areas of representative gear teeth. The major problem with this method is that the quality and accuracy of the sketch will vary greatly with the artistic ability of the inspector. In addition it is easy for the inspector to make the mistake of reversing the ahead and astern tooth flank sketches or reversing the right hand and left hand helices. In addition, viewing of the contacts is complicated by the lack of light inside the gear casing and by the reflections caused by any exterior light source.

It would be desirable to make a permanent, precise and objective record of loaded running tooth contacts in order to allow accurate decisions to be made regarding the bearing adjustments necessary to achieve optimum tooth contact under full design load. It is also important to know of alignment/tooth contact changes that may take place by comparing the permanent record to future inspections.

Accordingly, one object of the present invention is to provide an improved method of permanently recording loaded running tooth patterns in large reduction gears.

Another object of the invention is to provide a more accurate method by way of video image recording the running tooth patterns which also removes the subjectivity which is inherent in individual hand sketch recording.

BRIEF DESCRIPTION OF THE DRAWINGS

These and other objects of the invention will become apparent by reference to the following description, taken in connection with the accompanying drawing, in which.

SUMMARY OF THE INVENTION

Briefly stated, the invention comprises an improved method for recording loaded running tooth contact patterns on large reduction gears comprising the steps of providing a pair of meshing gears, having transversely spaced teeth with surfaces subject to wear, coating said surfaces of at least one gear with a substance providing visual indication of tooth wear, running said gears under load, providing a platform adapted to move along the length of said teeth and adapted to support a video imaging probe, moving said platform along selected teeth while directing the probe at the contact surface of a transversely spaced "observed" tooth, and recording a video image of the observed tooth contact surface. The method further includes synchronizing said video image with the video image of an identification marker temporarily disposed adjacent to the observed tooth and synchronizing the video image with an audio record describing the location of said tooth contact pattern being observed. The preferred method includes a platform having a first pair of slidable guides to guide the platform and at least one additional of slidable guide to hold the platform level.

DESCRIPTION OF THE PREFERRED EMBODIMENT

Figure 1:
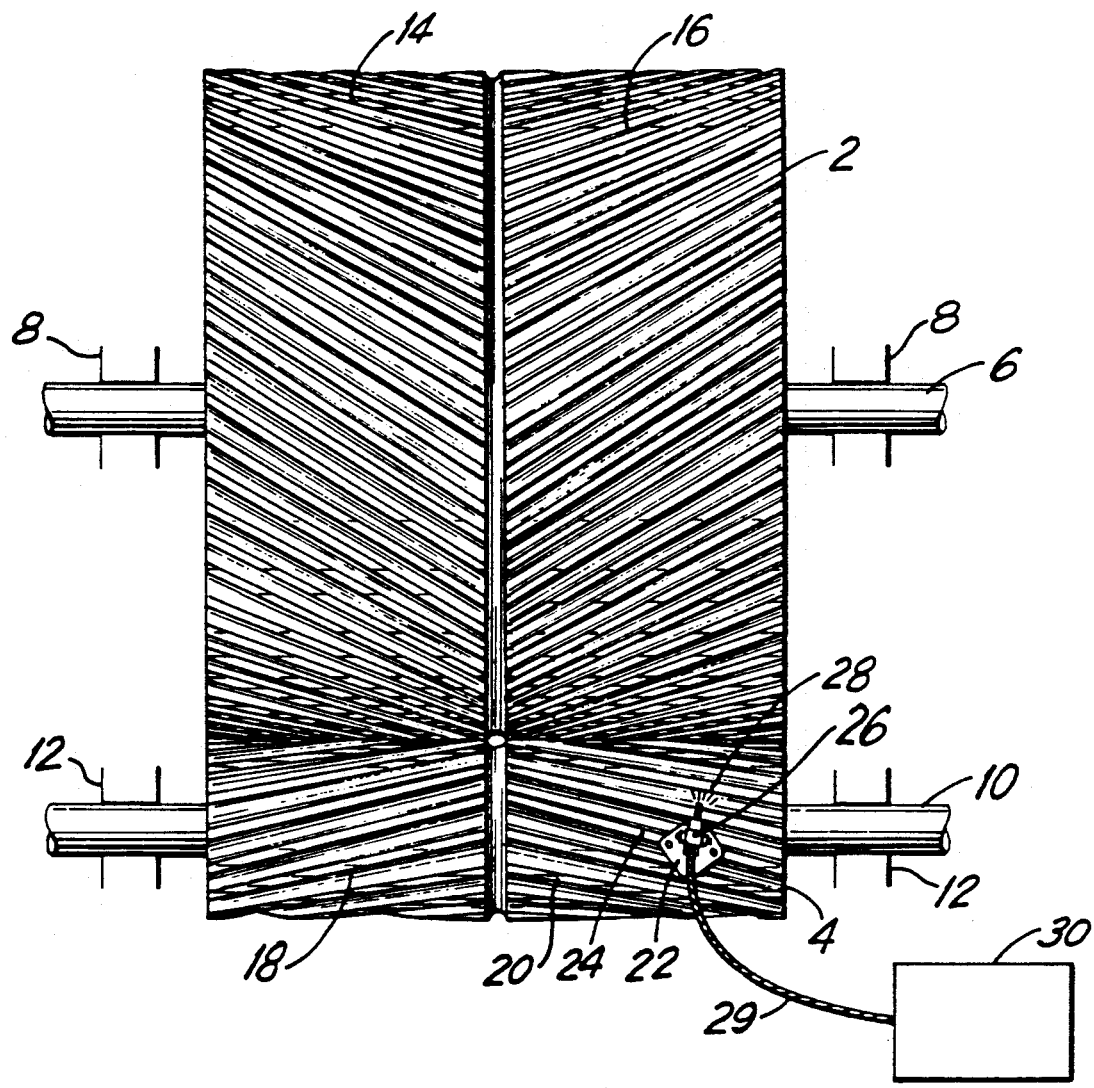
FIG. 1 is a simplified schematic plan view of a pair of double helical reduction gears.

Referring now to FIG. 1, a gear 2 and pinion 4 are shown representing one set of meshing gears in the reduction gearing of a navy or marine propulsion gear, it being understood that the single gear and pinion shown is only part of a larger complex of high torque precision gearing. Gear 2 is carried on a shaft 6 rotating in bearings 8 and pinion 4 is carried on a rotating shaft 10 turning in bearings 12. Gear 2 is of the double helical type with opposed helical gear sections 14 and 16. Similarly pinion 4 is double helical with opposed helical gear sections 18 and 20. The gear teeth are transversely (circumferentially) spaced from one another.

In accordance with the present invention, a platform 22 is adapted to be guided parallel to a selected guide tooth 24 and to carry a video imaging probe 26. Video imaging probe 26 is adapted to illuminate and transmit an optical image of the contact surface of a transversely spaced observed tooth 28. The image and illumination are conducted through a flexible fiber optic cable 29 and a permanent record is recorded in an external system 30 to be described later in detail.

Figure 2:
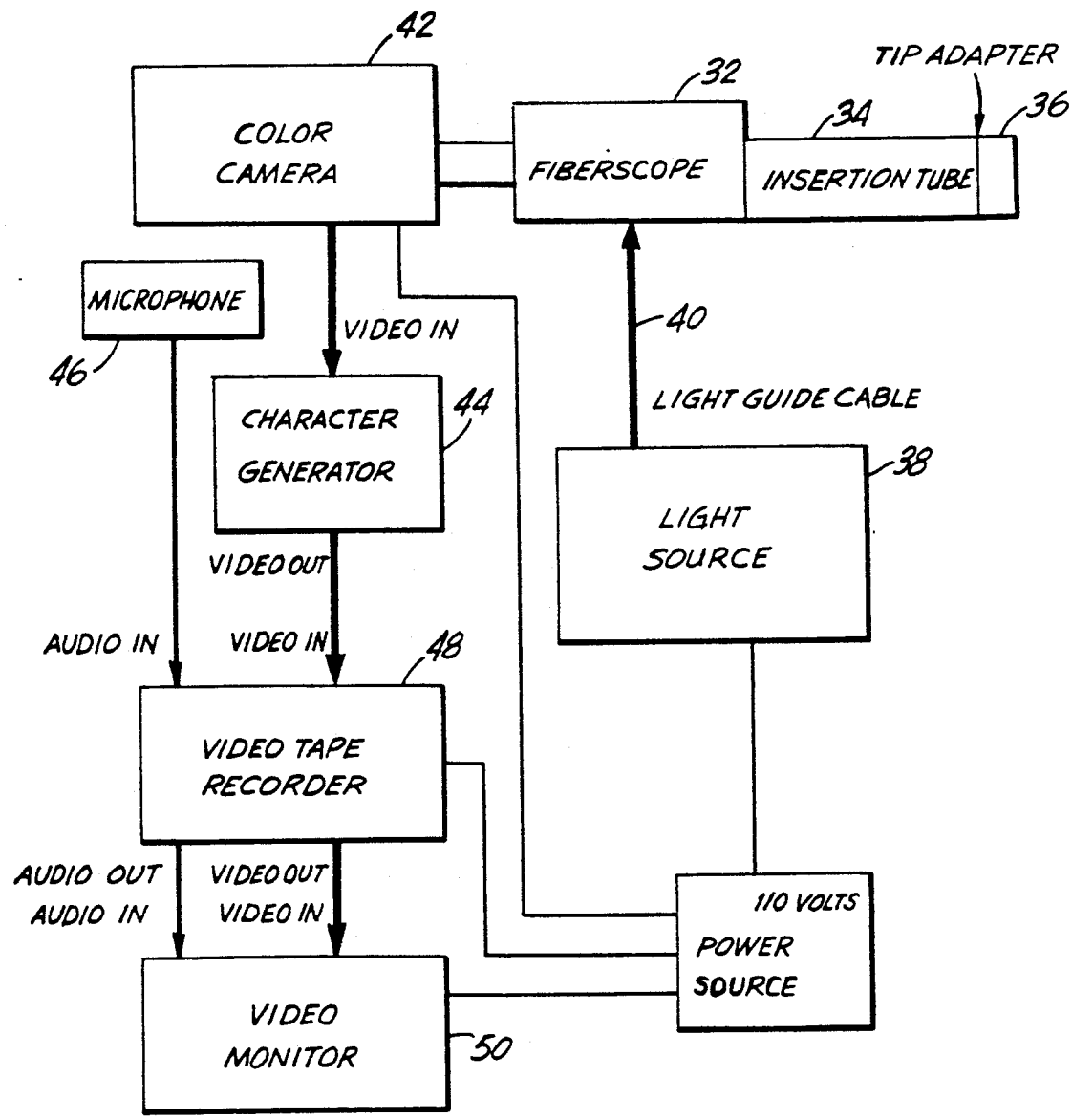
FIG. 2 is a simplified block diagram of a video imaging and audio recording apparatus.

Referring now to FIG. 2, a commercially available system is shown for video imaging and making a permanent video image record with synchronized sound record. The video imaging system comprises a fiberscope 32 with a flexible insertion tube 34 and tip adaptor 36. Fiberscope 32, insertion tube 34 and tip adaptor 36 are commercially available, a suitable system being available as an OES1F11D4 fiberscope available from Industrial Fiber Optics Division of Olympus Corporation. Insertion tube 34 is a flexible cable carrying fiber optic bundles which transmit illumination to the objective area and transmit a reflected image back to the fiberscope. A Xenon light source 38 is optically coupled to the fiberscope 32 through a light guide 40, while the reflected image is coupled to a conventional color video camera 42. A character generator 44 with keyboard permits entry of identifying text, while a microphone 46 allows a synchronized audio (verbal) description. Audio and video images are recorded on a conventional video tape recorder 48 for observation on a monitor 50.

Figure 3:
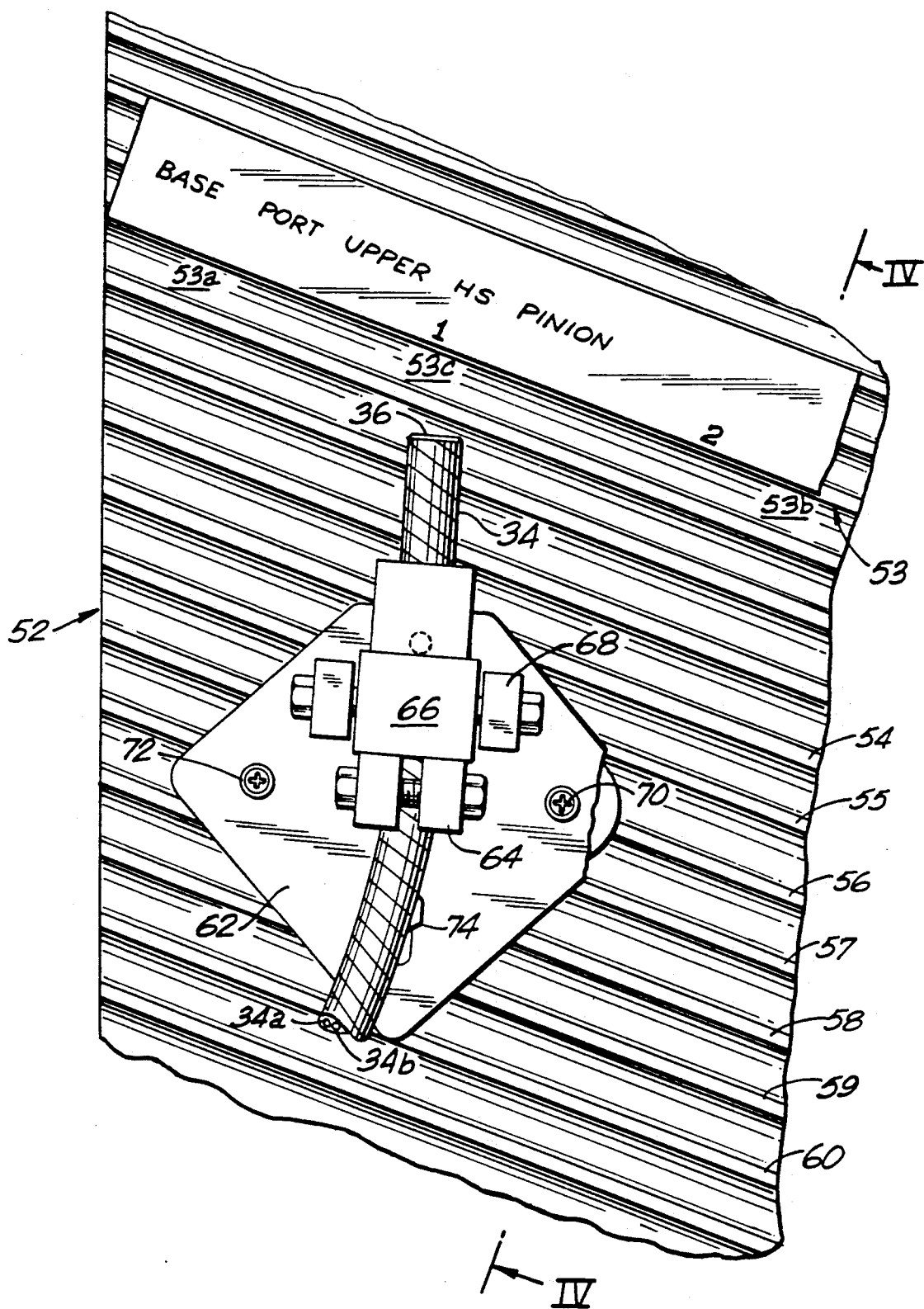
FIG. 3 is an enlarged, fragmentary plan view of the preferred video imaging apparatus used to carry out the process.

Reference to FIG. 3, illustrates a plan view of a preferred arrangement for carrying out the invention. A portion of a gear 52 illustrates transversely spaced helical teeth, such as 54 through 60 which are spaced from an observed tooth 53. Gear 52 has previously been coated with a substance providing a visual indication of tooth wear, a typical formulation being known as "Red Dykem DX-296" and run under load with a meshing gear (not shown). A running tooth contact surface area on which wear is generated by the tooth of a meshing gear is indicated on the flank of tooth generally along a line from 53a through 53b and beyond. A similar running tooth contact area is present along the flank of every tooth and, if the gear is reversible, along the opposite flank of the tooth as well.

In accordance with the present invention, a platform 62 is adapted to carry the probe insertion tube 34 in such a manner so as to direct the video imaging tip 36 in a transversed direction and angle (equal to the helix angle) toward a portion 53c of the observed running tooth contact area. This built-in angle of viewing eliminates glare reflection back into the image tip. The insertion tube 34 comprises a probe which both illuminates area 53c through one or more fiber optic light guides 34a and which carries a reflected image back to the fiber scope 32 through a fiber optic bundle 34b. Tube 34 is held in a clamp 64 on a probe holder 66 which may be swiveled and adjustably clamped in a u-shaped bracket 68. Platform 62 is located and guided by teeth 54–60 so that it may be manually moved along with the probe directed at the running tooth contact surface of the transversely spaced tooth 53. In order to accomplish this, a pair of adjustable slides 70 and 72 are threaded into the platform 62. Slides 70 and 72 are spaced axially from one another and adjustable in a radial direction perpendicular to the teeth. A pair of transversely spaced guides are mounted in platform 62. One of these designated as 74 is transversely adjustable by virtue of a slot 76, and the other is obscured in FIG. 3 by the probe.

Figure 4:
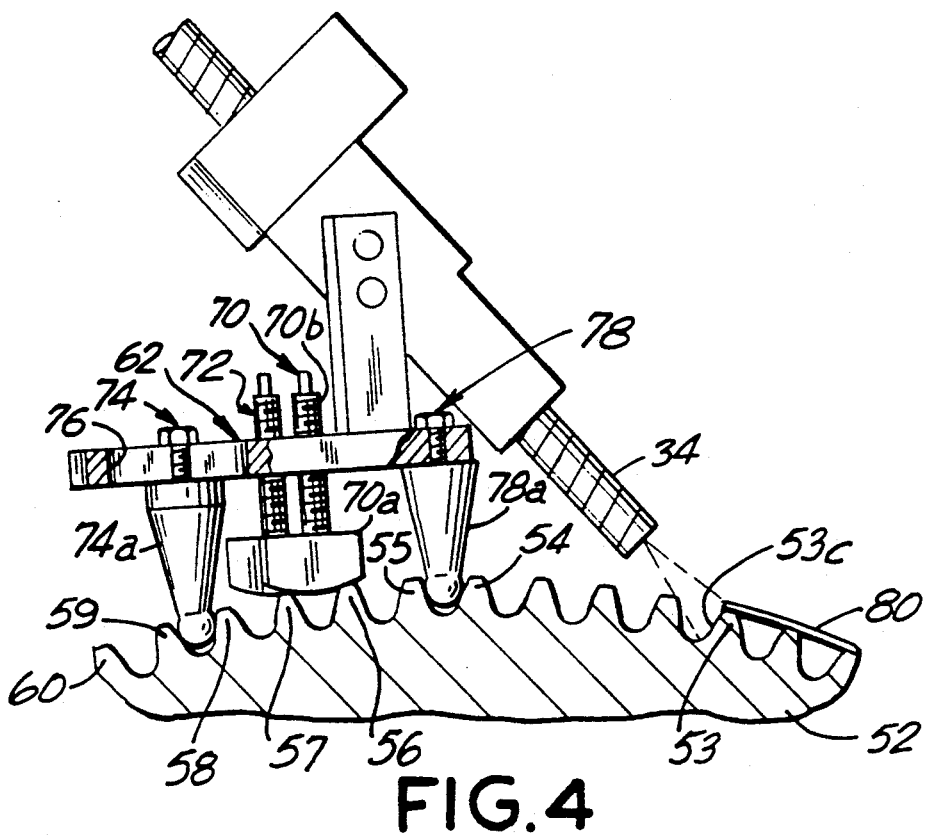
FIG. 4 is a cross sectional elevation view of the gear showing the apparatus, taken along lines IV—IV of FIG. 3.

FIG. 4 shows both of the transversely spaced guides 74 and 78, as well as the longitudinally spaced slides 70 and 72 which run are axially spaced. Each of the slides 70 and 72 includes a large teflon head, such as 70a on a threaded shaft 70b. Slides 70 and 72 slide on top of the teeth and are used to hold the platform level.

Each of the transversely spaced guides 74 and 78 carries a replaceable conical guide element 74a, 78a respectively which terminates in a ball adapted to ride between adjacent teeth. Adjustment of the rear guide 74 permits the proper transverse spacing, while the teflon slides 70a may be raised or lowered to permit the proper leveling of platform 62 and removing any play. Since either of the slides 70, 72 will form a tripod support with the two transversely spaced guides 74, 78, only one slide is active at a time, by maintaining pressure on the appropriate end of platform 62.

Figure 5:
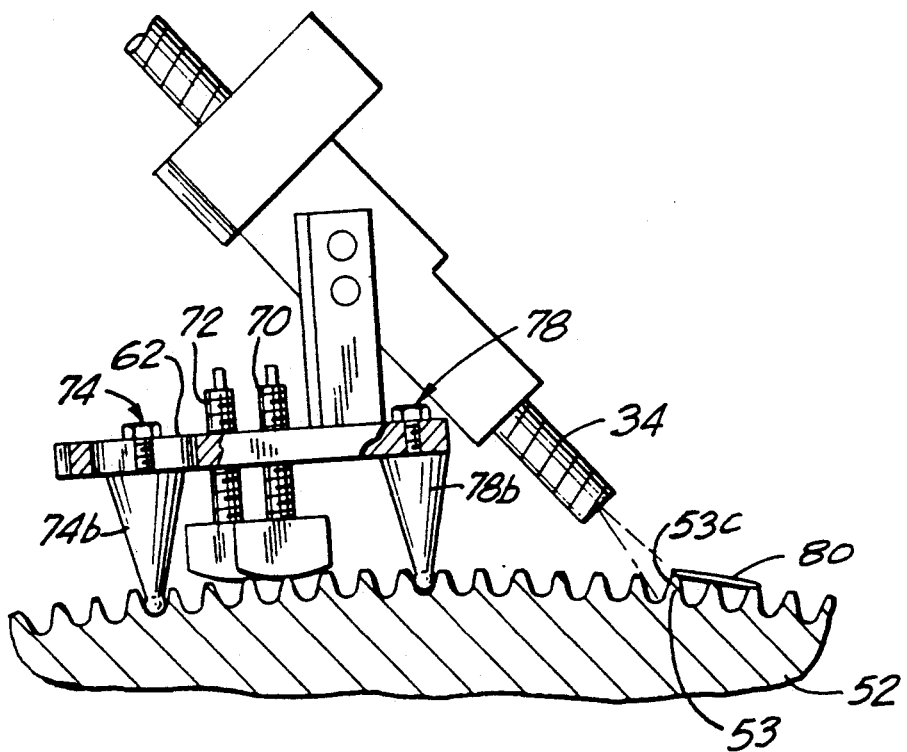
FIG. 5 is a cross section elevation view of the gear showing the apparatus on a smaller pitch gear.

The platform 62 is adaptable to any gear pitch by changing the replaceable conical guide elements with elements having a different ball diameter at the tip. Reference to FIG. 5 illustrates a smaller pitch gear tooth using a different set of replaceable guide elements 74b, 78b with smaller ball terminations. This substitution coupled with the transverse adjustment of guide 74 enables any diameter gear and any gear pitch to be accommodated.

While it is seen that the guides 74, 78 fit between transversely spaced pairs of teeth, they constrain the carriage 62 to move parallel to and in the direction of the gear teeth.

The method is carried out by turning on the video and audio equipment and manually moving the platform 62 by sliding it from one end of the tooth to the other in a prescribed pattern. Because of the diamond pattern of the guide supports, formed by two transversely spaced guides and two axially spaced slides, the inspector can maintain pressure on three of these and allow one of the slide (70 or 72) to go beyond the end of the tooth. This permits making a complete record from base to apex on both helices of the gear.

Means for synchronizing the video image with a record of the location and description of the tooth being examined is provided by means of a special identification magnetic marker which is temporarily placed alongside the observed tooth. This marker comprises a magnetic strip 80 with identifying indicia and a scale of length measurements along it. It may be laid over the tips of the teeth adjacent to the observed tooth 53 and imprinted with prearranged characters and numbers indicating the location of the tooth within the gear set. In this way a systematic and objective video image may be obtained which is synchronized with an audio record and a visual identification of the location on a tooth-by tooth basis. A representative number of teeth are examined, wear patterns analyzed and corrective action taken if necessary to adjust alignment by machining of the gear bearings.

Figure 6:
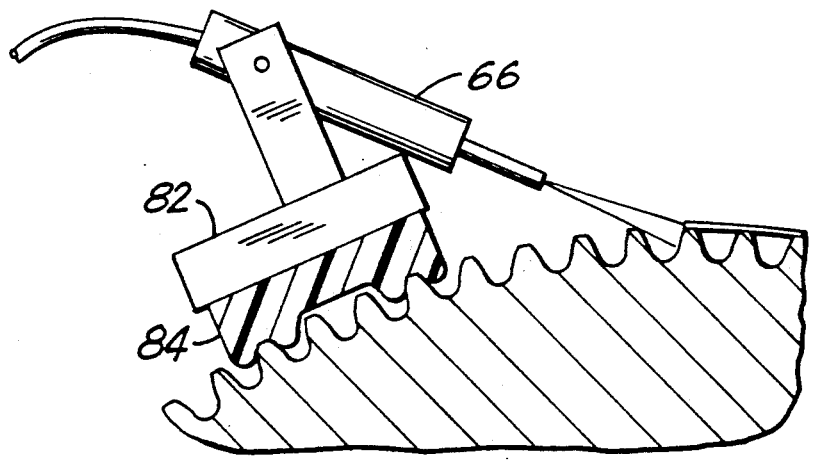
FIG. 6-8 are simplified elevation views of alternate types of video imaging platforms.
Figure 7:
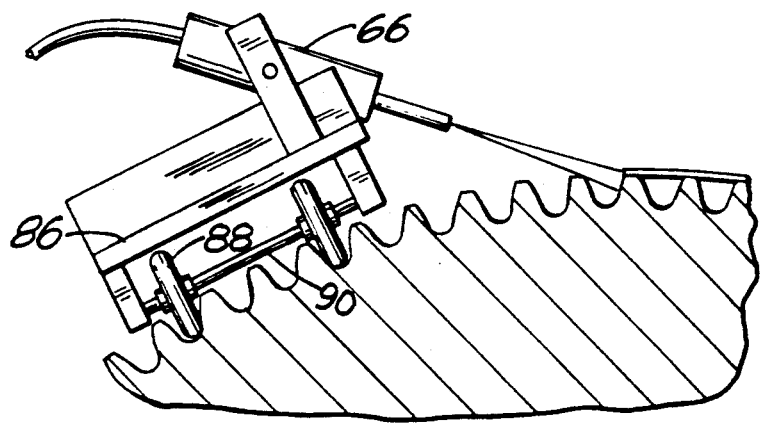
Figure 8:
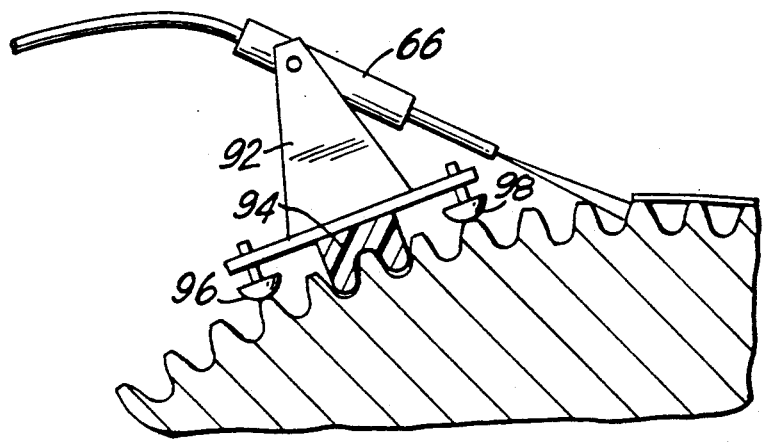

Although the preferred method for carrying out the invention utilizes the platform support shown in FIGS. 3 through 5, alternative types of platform mountings for the probe are possible as illustrated in simplified schematic views of FIGS. 6 through 8. In FIG. 6, a probe platform 82 is mounted on a teflon block 84 with grooves complementary to a selected pair of gear teeth. Pads 84 are interchangeable to provide for different gear pitches, requiring a number of pads.

FIG. 7 illustrates a probe carriage 86 having four wheels 88 which are slidable along the wheel axle 90 for adjustment to different gear pitches and radii. This arrangement, however, does not provide ability for the inspector to apply pressure to the platform at the end of the gear in order to use three of the four guides to support the platform.

FIG. 8 illustrates a carriage 92 with a teflon pad 94 guided by only one tooth and a pair of adjustable steadying elements 96, 98. The foregoing modifications in FIG. 6-8 are only intended to illustrate that fixtures other than the preferred one shown in FIGS. 3-5 are possible for use in carrying out the improved method.

While there has been described what is considered to be the preferred embodiment of the invention, other modifications will occur to those skilled in the art, and it is desired to include in the appended claims all such modifications as fall within the true spirit and scope of the invention.

We claim:

1. An improved method for recording loaded running tooth contact patterns on mating gears comprising:
   providing a pair of meshing gears having transversely spaced teeth with contact surfaces subject to wear,
   coating said contact surfaces on at least one of said gears with a substance providing a visual indication of tooth wear,
   running said gears under load,
   providing a platform mounting a video imaging probe,
   adjusting said video imaging probe on said platform to direct the probe at the contact surface of a transversely spaced tooth to be observed,
   moving said platform along the length of selected teeth while directing the probe at said contact surface, the platform having at least two guide elements each supported between a pair of adjacent gear teeth in order to guide said probe along the length of said selected gear teeth, said at least two guide elements located to one side of the tooth to be observed, and
   recording a video image of said contact surface of said observed tooth.

2. The method according to claim 1, including the additional step of recording a description of the location of said observed tooth within said at least one gear which is synchronized with said video image record.

3. The method according to claim 2, wherein said description recording step comprises temporarily attaching an identification marker with preselected indicia adjacent said observed tooth within the field of said video imaging probe.

4. The method according to claim 2, wherein said description recording step comprises making an audio recording describing the observed tooth location.

5. The method according to claim 1, wherein said video imaging probe includes a flexible fiber optic bundle and wherein said platform is moved manually.

6. The method according to claim 1, further including providing at least one adjustable slide element slidable on the top of a gear tooth between said at least two guide elements and adjusting said slide element to hold said platform level.

7. The method according to claim 1 wherein said probe is adjusted to an angle substantially identical to a helix angle of the observed tooth.

8. Apparatus for recording loaded running tooth contact patterns on mating gears comprising:
   a video imaging system including a video imaging probe; and
   a platform mounting said video imaging probe, said platform including an adjustment mechanism for directing said probe toward a contact surface of an observed gear tooth, said platform further provided with plural transverse guides adapted to ride between selected non-observed transversely spaced gear teeth pairs, said gear teeth pairs located to one side of the observed gear tooth.

9. Apparatus according to claim 8 wherein said video imaging system comprises a video camera, a video tape recorder and a monitor.

10. Apparatus according to claim 9 wherein the video imaging probe comprises a fiberscope coupled to said video camera.

11. Apparatus according to claim 10 and including a light source optically coupled to the fiberscope.

12. Apparatus according to claim 8 wherein said plural transverse guides comprise replaceable conical guide elements terminating in ball shaped guide surfaces.

13. Apparatus according to claim 8 wherein said plural transverse guides comprise a pair of grooves formed in a block member.

14. Apparatus according to claim 8 wherein said plural transverse guides comprise wheels slideable along an axle for adjustment to different gear pitches and radii.

15. Apparatus according to claim 8 wherein said plural transverse guides includes a pair of steadying elements cooperable with a grooved pad located between said elements.

16. Apparatus according to claim 8 wherein said longitudinal guides comprise pads threadably and adjustably mounted to said platform.

17. Apparatus according to claim 8 wherein said adjustment mechanism is adapted to adjust said video imaging probe is adjusted to an angle equal to a helix angle of the observed tooth.

18. Apparatus according to claim 8 and including an identification marker adapted for attachment to teeth adjacent the observed tooth.

* * * * *